United States Patent [19]

Anderson

[11] Patent Number: 4,573,198
[45] Date of Patent: Feb. 25, 1986

[54] OPTICAL IMAGE PROCESSING/PATTERN RECOGNITION SYSTEM

[75] Inventor: Robert H. Anderson, Long Beach, Calif.

[73] Assignee: Litton Systems, Inc., Beverly Hills, Calif.

[21] Appl. No.: 432,831

[22] Filed: Dec. 27, 1982

[51] Int. Cl.$^4$ .............................................. G06K 9/76
[52] U.S. Cl. ................... 382/31; 350/162.13; 350/376
[58] Field of Search .................. 350/162.12, 162.13, 350/162.14, 3.67, 3.68, 3.82, 377, 376, 150; 382/31; 250/550; 365/122, 125

[56] References Cited

U.S. PATENT DOCUMENTS 3,634,695  2/1970  Barringer .............................. 382/31
3,965,299  6/1976  Lin ....................................... 350/376

OTHER PUBLICATIONS

Craig et al., "Bubble Domain Electronic to Optical Image Transducer", *IBM Tech. Disclosure Bulletin*, vol. 13, No. 1 6/70.
Winzer et al., "Improved Holographic Matched Filter Systems for Pattern Recognition using a Correlation Method", *Optics and Laser Technology* Oct. 1972, vol. 4, No. 5.

*Primary Examiner*—Leo H. Boudreau

[57] ABSTRACT

A pattern recognition and optical image processing system employing dynamically alterable magneto-optic display assemblies operating as light modulators. A first pattern is digitized and used to drive a first magneto-optic display assembly disposed in a light beam. The pattern impressed upon the light beam is sensed at the Fourier plane and digitized as a representation of the spatial filter pattern of the first pattern. A second pattern is digitized. The digitized second pattern and the digitized spatial filter pattern of the first pattern are used to drive a pair of magneto-optic display assemblies disposed in a single light beam. The resultant correlation pattern is sensed and the degree of correlation match between the Fourier transform of one pattern and the spatial filter pattern of the other pattern is used as indication of the probability of a pattern match between the first and second patterns.

2 Claims, 1 Drawing Figure

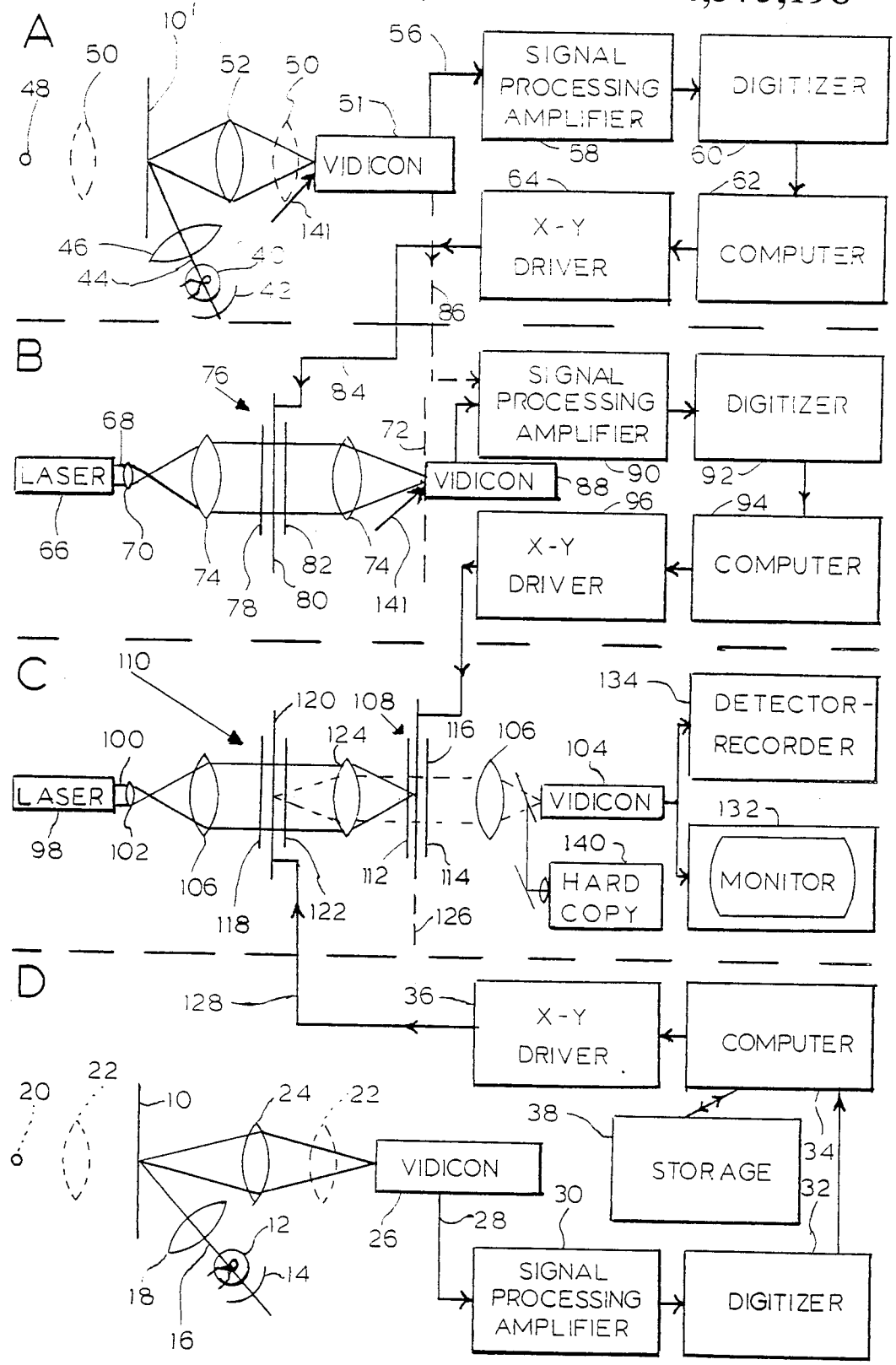

OPTICAL IMAGE PROCESSING/PATTERN RECOGNITION SYSTEM

BACKGROUND OF THE INVENTION

The present invention relates to pattern recognition systems and, more particularly, to pattern recognition systems operating on a real-time basis.

Pattern recognition systems have gained rapid acceptance and have been utilized in numerous applications since the advent of contemporary computer technology. Supermarket check-out lines include devices to scan the pre-marked products, virtually eliminating the old cash register button entry system. Word processing systems scan previously typewritten pages and digitize the data thus eliminating time consuming keyboard entry of text into the computer.

Most such systems, however, are limited to recognizing simple patterns such as single letters and product bar codes. Alignment and position within the scanned field can be a critical factor. Typically, the scanned character is digitized and the digital value scanned against a previously stored table of digital values for a match. In the absence of a match, the symbol goes unrecognized. A lack of proper character orientation at the time of scanning and digitization can result in a mis-digitization such that no recognition or a mis-recognition occurs.

Spatial filtering can be employed in character recognition with the advantage of positioning no longer being a factor. That is, a character or symbol at any position within the optic field will create a unique spatial filter pattern at the Fourier plane.

Wherefore, it is the object of the present invention to provide a character recognition system employing dynamically changeable spatial filtering techniques.

SUMMARY

The foregoing objective has been achieved by the pattern recognition system of the present invention comprising means for forming a digitized representation of a first pattern; means for forming a digitized representation of a second pattern; means operably connected to the second pattern digitized representation forming means for forming a digitized representation of the spatial filter pattern of the second pattern at the Fourier plane thereof; means for producing a light beam; means for sensing the light beam and for producing an electric signal at an output thereof reflecting any pattern impressed on the light beam; a first magneto-optic display assembly disposed in the light beam between the producing means and the sensing means, the first assembly being operably connected to be driven by the digitized representation of the first pattern; a second magneto-optic display assembly disposed in the light beam between the producing means and the sensing means, the second assembly being operably connected to be driven by the digital representation of the spatial filter pattern of the second pattern; means for focusing the first display assembly on the second display assembly; and, means operably connected to the output for evaluating the correlation of the first pattern to the spatial filter pattern of the second pattern as impressed on the light beam by the display assemblies whereby the degree of correlation match indicates the probability of a pattern match between the first and second patterns.

A series of patterns to be recognizable are sequentially digitized and stored for use at a later time. At recognition time, the object to be recognized is digitized and the digital value used to form a transparency thereof dynamically on a first magneto-optic display assembly disposed in a light beam being focused upon a vidicon placed at the Fourier plane. The image on the vidicon is, therefore, the spatial filter pattern of the object to be recognized. The signal from the vidicon representing the spatial filter pattern is digitized and used to drive a second magneto-optic display assembly placed in a second light beam. A third magneto-optic display assembly is placed in the second light beam ahead of the second magneto-optic display assembly and a relay lens is employed between the two to image the Fourier transform of one upon the other. The third magneto-optic display assembly is sequentially driven by the stored digitized values of the previously scanned recognition patterns and the resultant light beam containing the correlated combination of the known test image with the spatial filter of the unknown pattern is focused on a vidicon and the signal thereof inspected for a correlation match. The closest correlation match between the stored values indicates the highest probability of character match.

DESCRIPTION OF THE DRAWING

The single FIGURE is a simplified blocked diagram of the system according to the present invention in its preferred embodiment.

DESCRIPTION OF THE PREFERRED EMBODIMENT

The system of present invention to be described hereinafter uses a magneto-optic assembly comprising a polarization sheet, a magneto-optic chip including a selectably alterable magnetic layer exhibiting the Faraday effect, and a polarization analyzer which can be employed as a dynamic transparency or a dynamically alterable spatial filter. The details of such an assembly are described in British Pat. No. 1,180,334; particularly with reference to FIG. 4 thereof.

Turning now to the single FIGURE, it can be seen that the FIGURE is divided into four functional areas by the dotted lines, with the functional area being labelled "A", "B", "C", and "D", respectively. Within area A, the object or pattern to be recognized is sensed. Within area B, a spatial filter pattern of the object scanned in area A is generated. In area D, objects to be part of the pre-established recognition sequence are scanned. Finally, in area C, a comparison of the two takes place and correlation or non-correlation is established.

Turning first to area D, a single object 10 to be recognized at a later time is shown. Object 10 could be such things as a page of text, an aerial photograph, or a fingerprint record. If opaque, a bulb 12 and reflector 14 are used to form a light beam 16 which is focused by lens 18 on the object 10. If the object 10 is in the form of a transparency, a point source of light 20 and a pair of lens 22 (shown ghosted) can be employed. A focusing lens 24 is used to focus the illuminated image of the object 10 on the face of a vidicon tube 26. The vidicon tube 26 produces an electrical output signal on line 28 which is connected to a signal processing amplifier 30. The output of the signal processing amplifier 30 is connected to a digitizer 32. The output from the digitizer 32 is input to a digital computer 34 which in turn is connected to input desired configurations to an X-Y driver 36 for driving magneto-optic display assemblies. Objects 10 could be scanned individually in real-time at the time of character recognition. Such is usually not the desired approach. Rather, the digitized values from the digitizer 32 are stored by the digital computer 34 in storage 38 for later retrieval so that a comparison sequence can be accomplished rapidly when recognition is desired.

Turning now to area A, a similar component sequence is used to scan the object 10' to be recognized. In fact, many of the components in an actual implementation would probably be time-shared as, for example, the computer 34. For purposes of the simplified block diagram being discussed herein, however, the components are individually identified and labeled for discussion purposes. Therefore, in area A there is a bulb 40 and a reflector 42, a light beam 44, a lens 46, alternate point source of light 48 and collimating lenses 50, focusing lens 52, vidicon tube 51, output line 56, signal processing amplifier 58, digitizer 60, digitaal computer 62, and X-Y driver 64. Note that a storage corresponding to storage 38 is not required when the signal being processed in section A is for a single item being scanned at real-time.

Turning now to area B, a laser 66 provides a high intensity beam of coherent light 68. Light beam 68 is expanded by an expansion lens 70 and then collimated and refocused at the Fourier plane 72 by a pair of lenses 74. A first magneto-optic display assembly, generally indicated as 76, is disposed between the two lenses 74. Display assembly 76 comprises a polarizer 78, a magneto-optic chip 80, and a polarization analyser 82. The magneto-optic chip 80 is operably connected to the X-Y driver 64 through line 84 to be driven thereby. That is, the image on the vidicon 51 will be reproduced on the magneto-optic chip 80 so as to impress that image upon the light beam 68 and, therefore, produce a Fourier transform image thereof at the Fourier plane 72. Note that if in area A the point source 48 and collimating lenses 50 are employed with the object 10' as a transparency, the face of the vidicon 51 is at the Fourier plane and, therefore, output line 86 will have the spatial filter pattern desired directly thereon without the heretofore described apparatus of area B being necessary. Vidicon 88 has its input surface located at the Fourier plane 72 such that vidicon 88 senses the spatial filter pattern of the object 10'. The output from the vidicon 88 is connected as an input to signal processing amplifier 90. Note that if used, line 86 is connected as an input to the signal processing amplifier 90. The output from the signal processing amplifier 90 is input to a digitizer 92 the output of which is connected as an input to a digital computer 94 which, in turn, is connected to input to an X-Y driver 96. It should be noted that the signal processing amplifiers 30, 58, 90, the digitizers 32, 60, 92, the digital computers 34, 62, 94, and the X-Y drivers 36, 64, 96 are all elements well known to those skilled in the art and can be brought commercially or implemented for the purposes shown herein without undue experimentation. Therefore, no further details of these components are included herein.

Turning now to area C, a second laser 98 produces a light beam 100 which is expanded by expansion lens 102 and then collimated and refocused on vidicon 104 by a pair of lenses 106. A pair of magneto-optic display assemblies 108, 110, respectively, are disposed in light beam 100 between the two lenses 106. The display assembly 108 comprises a polarizer 112, a magneto-optic chip 114, and a polarization analyzer 116. The display assembly 110 comprises a polarizer 118 a magneto-optic chip 120, and a polarization analyzer 122. A Fourier transform lens 124 is disposed between the two display assemblies 108, 110 to form the Fourier transform of the image on the magneto-optic chip 120 onto the magneto-optic chip 114 which places the magneto-optic chip 114 at the Fourier plane 126 of the lens 124 and display assembly 110. As can be seen, the X-Y driver 36 is connected by line 128 to drive the magneto-optic chip 120 with the image of the object 10 directly or as a digital value thereof as previously scanned from storage 38. Likewise, X-Y driver 96 is connected by line 130 to drive the magneto-optic chip 114 with the spatial filter pattern of the object 10' being tested for recognition. If the spatial filter pattern appearing on chip 114 is the spatial filter pattern of the object pattern on chip 120, a virtually perfect correlation should appear on vidicon 104. The output of the vidicon 104 is connected to a monitor 132 for visual inspection and/or to a detector-recorder 134 for processing. Detector-recorder 134 can be in the form of a digital computer and storage which will go through the sequence of pre-established values in storage 38 maintaining a correlation match evaluation for each comparison made, and thereafter, provide a best guess at the recognition match based on the maximum correlation obtained in the test sequence. Here again, in actual implementation the computers 34, 62, 94, and detector-recorder 134 would most likely be implemented as subprograms and areas within a single digital computer.

If desired, a beam splitting half-silvered mirror 136 can be disposed in the light beam 100 adjacent the vidicon 104 to split off a portion 130 of the light beam 100 to provide a hard copy at 140 of the correlation pattern obtained.

It should be recognized by those skilled in the art that functional segment C is the major site of novelty of the present invention. In segment C, the information from the other segments comes together and the output information is produced. The components of segment C, of themselves, comprise an image processor having three salient image information planes—the input spatial light modulator plane 120, the input spatial filter plane 126, and the output plane at the light sensitive face of vidicon 104.

In a simpler system according to the present invention having more limited applications than the system shown in the FIGURE, a photographic transparancy, a liquid crystal light valve, a Bragg cell, or any other known spatial light modulator may be used in place of the magneto-optic spatial light modulator at plane 120, while retaining the advantage of the use of the magneto-optic chip as the spatial filter at plane 126.

Similarly, the afore-mentioned other light modulators may be used in place of the magneto-optic spatial filter in plane 126, while retaining the advantage of the use of the magneto-optic chip as the spatial light modulator at plane 120.

While a vidicon is shown as the light sensitive output image receiving element in the FIGURE, other devices may be used as well—e.g., an orthicon tube, an image orthicon, a charge-coupled solid-state camera, an iconoscope or image iconoscope, a Farnsworth image dissector, or a photographic film. Additionally, a magneto-optic chip and associated detector may also be used in place of the vidicon shown in the FIGURE by placing the output image on the magneto-optic chip and transmitting pixel information through the chip serially. As used in the claims hereinafter, it is to be understood that the term "vidicon" is intended to encompass all such equivalent devices and not be limiting to the device of that specific designation only.

Accordingly, the major site of novelty of the present invention can be described as a three plane image processor in which a magneto-optic light valve is used in any one of the three salient planes, or in any two, or in all three of those planes.

It should also be recognized that the input information coming to planes 120 and 126 from the functional segments A, B, and D may come from information stored in the computer shown, from information sources 10 and 10' which are present in real-time, or from a combination in which part of the information is generated in real-time and part is read out of storage.

It should be equally evident that if laser 98 provides illumination which is adequately polarized, polarizer 118 may be omitted, and similarly, polarizers 112 and 122, while convenient for adjustment, are not both absolutely essential, and either one can be omitted.

Additionally, it will be seen that where a number of initially unidentified images are to be compared with a number of known images, these two types of images may be entered at planes 10 and 10', respectively, or they may be interchanged and entered at planes 10' and 10, respectively, when convenient for the operator.

Moreover, it should also be understood that the production of the spatial filter pattern on vidicons 51 or 88 may be improved by the use of the well-known two-beam Vander Lugt configuration (A. Vander Lugt "Signal Detection by Complex Spatial Filtering", IEEE Transactions on Information Theory, April 1964, page 139) in which the Fourier transform plane is also illuminated by a reference beam 141 (see functional segments A and B) which is coherently derived from the transform illumination source.

Wherefore, having thus described my invention, I claim:

1. A pattern recognition system comprising:
   (a) means for producing a first light beam;
   (b) a first magneto-optic display assembly disposed in said first light beam;
   (c) a second magneto-optic display assembly disposed in said first light beam after said first magneto-optic display assembly;
   (d) a first vidicon tube;
   (e) first focusing means disposed in said first light beam after said second magneto-optic display assembly for focusing said first light beam on said first vidicon tube;
   (f) means for forming a second light beam with a first pattern impressed thereon;
   (g) a second vidicon tube;
   (h) second focusing means disposed in said second light beam for focusing said second light beam on said second vidicon tube;
   (i) first signal processing means for receiving and placing the output signal from said second vidicon tube in a usable form;
   (j) a first digitizer connected to receive the signal from said first signal processing means and digitize it;
   (k) first driver means connected between said first magneto-optic display assembly and said first digitizer for driving said first magneto-optic display assembly as a function of the signal from said first digitizer;
   (l) means for forming a third light beam;
   (m) a third vidicon tube;
   (n) a third magneto-optic display assembly disposed in said third light beam;
   (o) third focusing means disposed in said third light beam for focusing said third light beam on said vidicon tube;
   (p) second signal processing means for receiving and placing the output signal from said third vidicon tube in a usable form;
   (q) a second digitizer connected to receive the signal from said second signal processing means and digitize it;
   (r) second driver means connected between said second magneto-optic display assembly and said second digitizer for driving said second magneto-optic display assembly as a function of the signal from said second digitizer;
   (s) means for forming a fourth light beam with a second pattern impressed thereon;
   (t) a fourth vidicon tube;
   (u) fourth focusing means disposed in said fourth light beam for focusing said fourth light beam on said fourth vidicon tube;
   (v) third signal processing means for receiving and placing the output signal from said fourth vidicon tube in a usable form;
   (w) a third digitizer connected to receive the signal from said third signal processing means and digitize it;
   (x) third driver means connected between said third magneto-optic display assembly and said third digitizer for driving said third magneto-optic display as a function of the signal from said third digitizer whereby said first magneto-optic display assembly contains the image of said first pattern and said second magneto-optic display assembly contains the image of the spatial filter pattern of said second pattern; and,
   (y) means operably connected to the output of said first vidicon for evaluating the correlation of the Fourier transform of said first pattern to said spatial filter pattern of said second pattern as impressed on said first light beam by said first and second magneto-optic display assembly whereby the degree of correlation match indicates the probability of a pattern match between said first and second patterns.

2. A pattern recognition system comprising:
   (a) first means for forming a digitized representation of a first pattern;
   (b) second means for forming an object representation of a second pattern including:
      (i) a first vidicon tube;
      (ii) third means for impressing said second pattern on a first light beam and for focusing said first light beam on said first vidicon tube thereby generating a corresponding output signal;
      (iii) first signal processing means for receiving and placing the output signal from said first vidicon tube in a usable form;
      (iv) a first digitizer connected to receive the signal from said first signal processing means and digitize it as an output signal;
   (c) fourth means for forming a spatial filter pattern of said second pattern including;
      (i) fifth means for producing a second light beam;
      (ii) a second vidicon tube;

(iii) a first magneto-optic display assembly disposed in said second light beam, said first assembly being operably connected to be driven by the output signal from said first digitizer;
(iv) sixth means in said second light beam after said first magneto-optic display assembly for focusing said second light beam on said second vidicon;
(v) second signal processing means for receiving and placing the output signal from said second vidicon tube in a usable form; and,
(vi) a second digitizer connected to receive the signal from said second signal processing means and digitize it as a digital representation of a corresponding spatial filter pattern of said second pattern at the Fourier plane thereof;

(d) seventh means for producing a third light beam;
(e) eighth means for sensing said third light beam and for producing an electrical signal at an output thereof reflecting any pattern impressed on said third light beam;
(f) a second magneto-optic display assembly disposed in said third light beam between said seventh producing means and said eighth sensing means, said second assembly being operably connected to be driven by said digitized representation of the first pattern;
(g) a third magneto-optic display assembly disposed in said third light beam between said seventh producing means and said eighth sensing means, said third assembly being operably connected to be driven by said digital representation of said spatial filter pattern;
(h) ninth means for projecting the Fourier transform of said second display assembly on said third display assembly; and,
(i) tenth means operably connected to said eighth means output for evaluating the correlation of the Fourier transform of the first pattern to said spatial filter pattern of the second pattern as impressed on said third light beam by said display assemblies so that the degree of correlation match indicates the probability of a pattern match between the first and second patterns.

* * * * *